June 17, 1930.   E. W. BRANDENSTEIN   1,765,298
SELF PROPELLED VEHICLE

Original Filed Oct. 11, 1928

Inventor:
Erroll W. Brandenstein
by Charles E. Tullar
His Attorney.

Patented June 17, 1930

1,765,298

UNITED STATES PATENT OFFICE

ERROL W. BRANDENSTEIN, OF SCHENECTADY, NEW YORK, ASSIGNOR TO GENERAL ELECTRIC COMPANY, A CORPORATION OF NEW YORK

SELF-PROPELLED VEHICLE

Application filed October 11, 1928, Serial No. 311,853. Renewed November 12, 1929.

My invention relates to self-propelled vehicles wherein an engine is arranged to drive a generator which in turn supplies current to electric motors connected to the axles of the vehicle.

In a vehicle of this kind the maximum power output of the engine is obtained at normal speed and full throttle opening. The load on the engine is determined by the voltage-current characteristic curve of the generator which supplies current to the driving motors. It has, therefore, been the practice heretofore to provide the generator with a differential series field so as to give it a very rapidly drooping voltage-current characteristic curve. Under this condition the power output of the generator increased as the load current increased over a portion of the range of operation and then decreased quite rapidly over the remainder of the range of operation. The engine, on the other hand, supplies substantially constant maximum power output so that the generator utilized the maximum power of the engine only over a small portion of the range of operation thereof.

The object of my invention is to provide a self-propelled vehicle of this character in which the generator has such an electrical characteristic that it utilizes substantially the maximum power of the engine throughout the range of variation of voltage and current thereof during its operation. I accomplish this by providing an engine for driving a generator having a driving motor for the vehicle connected thereto, and an excitation system for the generator in which the major portion of the excitation thereof is maintained substantially constant throughout a portion of the range of operation of the generator, and in which the major portion of the excitation thereof is varied substantially in accordance with an electrical characteristic of the generator throughout the remainder of its range of operation.

My invention will be more fully set forth in the following description referring to the accompanying drawing, and the features of novelty which characterize my invention will be pointed out with particularity in the claims annexed to and forming a part of this specification.

Figure 1:
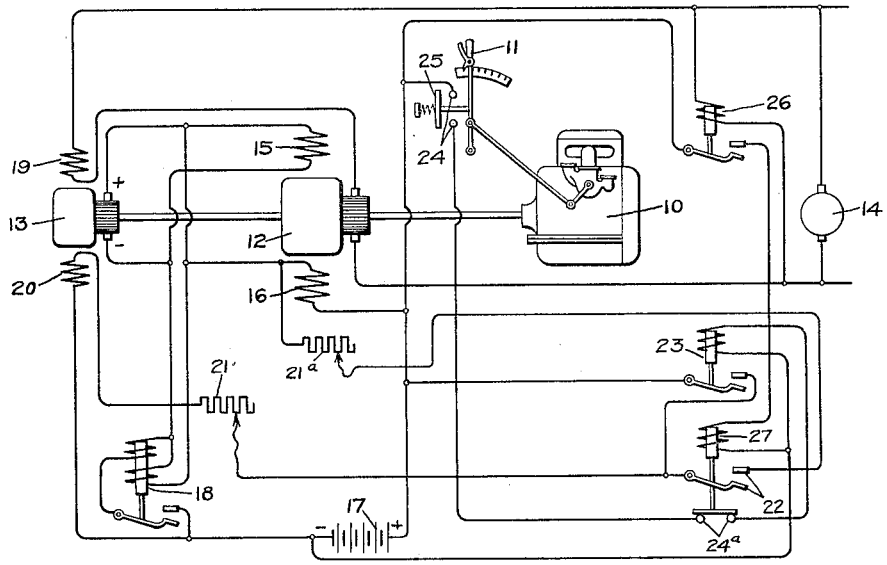
Figure 2:
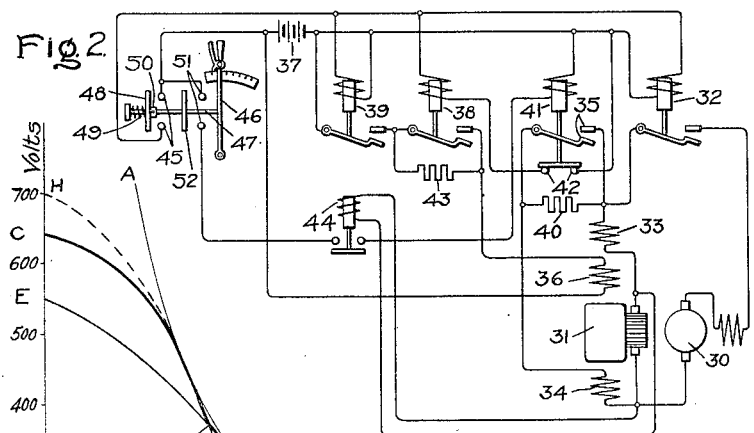
Figure 3:
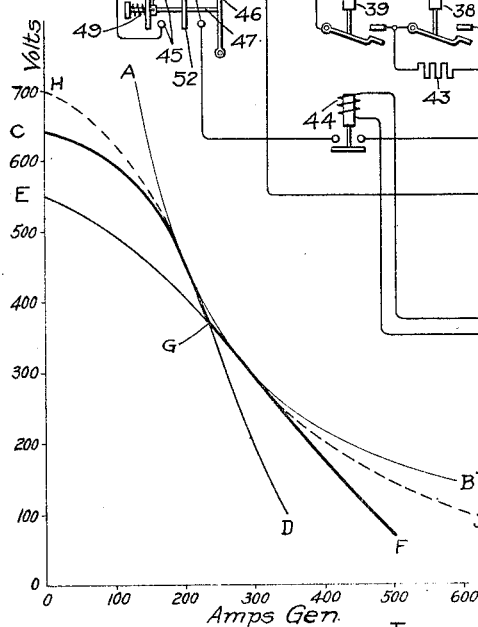

Fig. 1 is a diagrammatic view of the self-propelled vehicle embodying my invention; Fig. 2 is a diagrammatic view of a modified form of excitation system for the generator in a vehicle of the construction shown in Fig. 1, and Fig. 3 is a diagram of voltage-current characteristic curves of the generators of the vehicles shown in Figs. 1 and 2.

Referring to the drawing the self-propelled vehicle shown in Fig. 1 includes an engine 10 of the internal combustion or other suitable type which is controlled by a throttle lever 11, and which is arranged to drive a generator 12 and an exciter 13, the vehicle being propelled by a driving motor 14 which is connected to the generator 12. At normal speed and full throttle opening the engine 10 develops maximum power which can be conveniently represented by a voltage-current curve indicated in Fig. 3 by the equilateral hyperbola A—B. If the maximum power output of the engine is to be utilized throughout the entire range of variation of voltage and current of the generator 12, it is apparent that the characteristic curve thereof must correspond to the curve A—B. If the major portion of the generator excitation is self-excitation, or excitation in which the major portion thereof is provided by a self-excited exciter, the excitation of the generator varies substantially in accordance with an electrical characteristic thereof and the voltage-current curve of the generator for constant speed is represented by the line C—D. It will be observed that this curve is a fair approximation of the upper branch of the equilateral hyperbola A—B, but diverges very widely therefrom as the voltage of the generator decreases, so that varying a major portion of the generator excitation in accordance with an electrical characteristic thereof does not effectively utilize the power output of the engine at low voltage of the generator. When the major portion of the excitation of the generator is separate excitation, or is provided by the separately excited exciter connected to its excitation system, the voltage-current characteristic curve of the generator is indicated by the line E—F in Fig. 3, which is a much better approximation of the lower branch of the equilateral hyperbola A—B than the curve C—D, but diverges from the upper branch thereof. It will thus be seen that neither supplying a major portion of the excitation of the generator in accordance with an electrical characteristic of the generator, nor maintaining a major portion of the excitation thereof substantially constant will effectively load the engine over more than a small portion of the range of operation thereof.

In accordance with my invention, therefore, I provide an excitation system for the generator such that a major portion of the excitation thereof will vary in accordance with an electrical characteristic of the generator throughout a portion of the range of operation thereof, and that a major portion of the excitation thereof will be substantially constant throughout the remainder of the range of its operation. In this way the constant speed voltage-current characteristic curve of the generator is made to closely approximate the maximum power output of the engine throughout the entire range of operation of the generator. As shown in Fig. 3 of the drawing, the major portion of the generator excitation is varied in accordance with an electrical characteristic thereof over a range of operation indicated by the curve C—G, and over the remainder of its range of operation the major portion of the excitation thereof is maintained substantially constant, which gives the generator characteristic-curve the form indicated by the curve G—F. As a result, the generator characteristic-curve over the entire range of its operation at constant speed is of the form C—F. In operation of the vehicle, however, the characteristic curve of the generator is actually a somewhat better approximation to the maximum power output curve A—B of the engine than the curve C—F, and is of the form indicated by the dotted curve H—J. This is for the reason that when the generator is being operated over the range C—G, the engine is underloaded which permits it to increase in speed and thereby raise the voltage of the generator to the value indicated by the dotted line H—G. In the same way, when the generator is operating over the range G—F the engine is somewhat underloaded so that it increases in speed sufficiently to raise the voltage of the generator so that the characteristic curve in operation of the vehicle is indicated by the dotted line G—J. It will thus be seen that I have provided an arrangement in a self-propelled vehicle of this character in which the generator utilizes substantially the maximum power output of the engine throughout the entire range of operation of the generator.

In the particular embodiment of my invention shown in Fig. 1, the generator 12 is provided with an excitation system comprising field exciting windings 15 and 16. The winding 15 which supplies the major portion of the generator excitation is connected directly across the terminals of the exciter 13, and the winding 16 is connected across the exciter by a circuit including a battery 17 and the contacts of a reverse current relay 18 having an operating coil connected across the terminals of the exciter. In this way the field exciting winding 16 is utilized to obtain the necessary voltage drop to charge the battery 17 from the exciter, and the reverse current relay 18 prevents the battery being discharged through the exciter when its voltage is below that of the battery.

In order to give the generator 12 the desired characteristic I provide the exciter 13 with a differential field exciting winding 19 which is connected in series with the generator and the driving motor 14 of the vehicle, and I also provide the exciter with field exciting winding 20 for supplying the major portion of its excitation which is adapted to be excited in accordance with an electrical characteristic of the generator throughout a portion of its range of operation, and to be provided with substantially constant excitation throughout the remainder of the range of operation of the generator.

The winding 20 is excited in accordance with an electrical characteristic of the generator by connecting the same across the exciter 13 by a circuit including the contacts of the reverse current relay 18, and by connecting the other terminal thereof to the positive terminal of the exciter 13 through variable resistance 21, contacts 22 and variable resistance 21ᵃ. As the engine is operated at substantially constant speed the voltage of the generator 12 depends upon the current supplied thereby to the driving motor 14, and as the exciter differential field is in series with the generator and motor the excitation of the exciter is influenced by the current or voltage of the generator. If the exciter 13 is self-excited when the differential field reduces its excitation slightly the terminal voltage thereof decreases which decreases the self-excitation thereof and gives the exciter a very rapidly drooping characteristic. As a result, the excitation of the winding 15 and that of the generator is varied in accordance with an electrical characteristic thereof, which gives the generator a characteristic of the form indicated by the curve C—G in Fig. 3, and which in actual operation will be of the form of the curve H—G on account of the slight variation in engine speed, as previously explained.

Substantially constant excitation of the winding 20 is obtained by connecting one terminal thereof directly to the negative side of the battery 17, and the other terminal thereof to the positive side of the battery 17 through contacts of a relay 23. By this arrangement the major portion of the excitation of the exciter supplied by the winding 20 is maintained constant so that the differential field 19 does not greatly affect the total excitation of the exciter. As the generator and exciter are operated at constant speed the voltage of the exciter remains substantially constant, and the excitation of the winding 15, which supplies the major portion of the excitation of the generator, remains substantially constant. This gives the generator constant speed characteristic curve the form indicated by the curve F—G in Fig. 3, which in actual operation will be of the form of the curve J—G, because of a slight variation in engine speed. In order to prevent energization of the field exciting winding 20, when the engine is idling, the relay 23 is connected across the battery 17 through contacts 24 of a switch 25, which is arranged adjacent the trottle lever 11 so as to be opened, and thereby open the circuit between the battery and the operating coil of the relay 23, when the lever 11 is moved to close the throttle to idling position, and which is adapted to close and thereby energize relay 23 so as to close the contacts thereof and connect the battery 17 to the field exciting winding 20 and energize the same when the lever 11 is moved to open the throttle.

During operation of the vehicle when the load current of the generator is high the voltage thereof is low and under this condition the generator will be operating over the portion of its characteristic curve indicated by the dotted line J—G in Fig. 3. As the load current of the generator decreases upon a change in torque load on the motor the voltage of the generator will rise above the value at G so that the characteristic of the generator should be changed to conform to the dotted line G—H. I prefer to control this change in the excitation of the generator by an electrical characteristic thereof. In the construction shown in Fig. 1 I do this by means of a voltage relay 26 having an operating coil connected across the generator so as to close the contacts thereof when the voltage of the generator reaches a value indicated at G in Fig. 3. The contacts of the relay 26 are arranged to connect the operating coil of a relay 27 across the battery 17 so that upon closing the contacts of the relay 26, the contact arm of the relay 27 opens the contacts 24ª, so as to deenergize the relay 23 and disconnect the field exciting winding 20 from the positive terminal of the battery. The relay 27 is also arranged to close the contacts 22 to complete a circuit between the field exciting winding 20 and the positive terminal of the battery 17 through the resistances 21 and 21ª upon opening of the contacts 24. As the reverse current relay 18 is normally closed during the operation of the generator it will be observed that closing the contacts 22 connects the field exciting winding 20 directly across the terminals of the exciter 13 so that it is energized in accordance with an electrical characteristic of the generator 12. By this arrangement, as long as the voltage of the generator is above the value indicated at G in Fig. 3, the relay 26 will remain closed so that the voltage-current characteristic curve thereof throughout this portion of its range of operation will be of the form indicated by the curve G—H. On the other hand, if the load current of the generator increases, due to an increase in load on the vehicle, such as would result from an increase in the grade, and the voltage of the generator decreases below a value indicated at G in Fig. 3, the relay 26 will open, thereby deenergizing the relay 27 which will open the contacts 22 and close the contacts 24. This opens the circuit between the positive terminal exciter 13 and the field exciting winding 20 including the resistances 21 and 21ª, and energizes the relay 23 so as to connect the field exciting winding 20 across the battery 17 to maintain the major portion of the excitation of the generator substantially constant. In this way when the voltage of the generator 12 is less than the voltage indicated at G in Fig. 3, the characteristic curve thereof will be of the form indicated by the dotted line G—J, and when the generator voltage is greater than that indicated at G the characteristic curve will be of the form G—J. As a result the maximum power output of the engine will be effectively utilized throughout the entire range of operation of the generator.

The desired form of the voltage-current characteristic curve of the generator may also be obtained in accordance with my invention by the arrangement shown in Fig. 2. In this construction the driving motor 30 of the vehicle is connected to the generator 31 through the contacts of a relay 32 and a differential series field winding 33 of the generator. The excitation system of the generator 31 also includes a shunt winding 34 which is adapted to be connected across the terminals of the generator, through contacts 35, and a field exciting winding 36 which is adapted to be connected across the terminals of a battery 37 through the contacts of relays 38 and 39. The maximum constant power output of the engine driving the generator 31 may also be conveniently represented by the equilateral hyperbola A—B in Fig. 3. In order to make the voltage-current characteristic curve of the generator 31 substantially conform to the curve A—B throughout the range of operation of the generator, I maintain the major portion of the generator excitation substantially constant over the range of operation indicated by the dotted curve J—G in Fig. 3, and then excite the generator 31 in accordance with an electrical characteristic thereof throughout the range of operation indicated by the curve G—H.

In order to maintain the major portion of the excitation of the generator substantially constant over the range of operation indicated by the curve J—G in Fig. 3, I connect the field exciting winding 36 across the battery 37 through the contacts of relays 38 and 39. Under this condition the major portion of the excitation of the generator is provided by the winding 36, and as the excitation thereof is constant, the differential series winding 33 only slightly affects the form of the generator characteristic curve. At the same time the shunt field exciting winding 34 is connected across the terminals of the generator 31 through resistance 40 of such magnitude that the winding 34 produces only a minor portion of the excitation of the generator. This gives the characteristic curve of the generator the form of the curve J—G in Fig. 3.

After the voltage of the generator 31 increases above the value indicated at G in Fig. 3 the voltage-current curve thereof should be of the form G—H. To obtain this form of the characteristic curve of the generator it must be excited in accordance with an electrical characteristic thereof throughout the range of its operation G—H. I, therefore, reduce the excitation of the winding 36 so that it supplies a minor portion of the excitation of the generator, and at the same time increase the excitation of the shunt winding 34, which is energized in accordance with the voltage of the generator, so that it supplies the major portion of the excitation of the generator. Under this condition when the differential series field of the generator reduces the excitation slightly the voltage thereof is also reduced which further decreases the excitation by decreasing the excitation of the shunt winding 34, and gives the generator a very rapidly drooping voltage-current characteristic curve as indicated at G—H in Fig. 3, which substantially conforms to the power output curve A—B of the engine.

The proportion of the excitation of the generator 31 supplied by the winding 36 is decreased, and the proportion of the excitation of the generator supplied by the shunt winding 34 is increased in any convenient manner. In the embodiment of my invention shown in Fig. 2, however, I do this by connecting contacts 35 of a relay 41 across the resistance 40 in circuit with the field exciting winding 34, and contacts 42 thereof in circuit with the battery 37 and the operating coil of the relay 38 so as to control a resistance 43 connected across the contacts of the relay 38. The resistance 43 is of such magnitude that when the contacts of the relay 38 are opened the field exciting winding 36 supplies a small proportion of the excitation of the generator 31. By this arrangement when the relay 41 is energized to close the contacts 35 and increase the excitation of the field exciting winding 34 by short circuiting the resistance 40, the contacts 42 thereof will be opened which will deenergize the operating coil of the relay 38 and open the contacts thereof which will place the resistance 43 in circuit with the battery and field exciting winding 36 and reduces the excitation thereof. This gives the generator characteristic curve the form of the curve G—H in Fig. 3, over this portion of its range of operation. In order to control the change in excitation by an electrical characteristic of the generator 31, I connect the contacts of a voltage relay 44 in the circuit between the operating coil of the relay 41 and the battery 37 and connect the operating coil of the voltage relay across the terminals of the generator 31. In this way the operating coil of the relay 41 cannot be energized until the voltage of the generator has reached a predetermined value and, in the present instance, this relay is adjusted so that it closes the contacts thereof and energizes the operating coil of the relay 41 when the voltage of the generator is approximately equal to the value indicated at G in Fig. 3.

When the engine driving the generator 31 is idling, it is desirable that the excitation system thereof be deenergized, and that the driving motor 30 be disconnected therefrom. I do this by connecting one side of the operating coils of the relays 32, 38 and 39 to one terminal of the battery 37 through contacts 45 of the switch controlled by a throttle lever 46 of the engine. This switch comprises a push-rod 47 adapted to engage the throttle lever 46 when it is moved to close the throttle and having a bridge 48 slidably mounted thereon and insulated therefrom which is retained by a spring 49 against a collar 50. By this arrangement when the throttle lever 46 is moved to open the throttle and start the vehicle, the bridge 48 is brought into engagement with the contacts 45 by the spring 49, so that the operating coils of the relays 32, 38 and 39 are energized, which connects the motor 30 across the terminals of the generator 31 and connects the field exciting winding 36 directly across the terminals of the battery 37. As long as the voltage of the generator is less than the value indicated at G in Fig. 3, the generator will have a voltage-current characteristic of the form of the curve J—G in Fig. 3, but when the voltage of the generator is equal to the value indicated at G the voltage relay 44 will close the contacts thereof and energize the relay 41 so as to increase the excitation of the shunt field exciting winding 34 and decrease the excitation of the field exciting winding 36 to give the generator characteristic the form G—H, as previously explained.

It is desirable to have this change in excitation under control of the operator under some conditions. I accomplish this by connecting one terminal of the operating coil of the relay 41 directly to the battery 37 and the other terminal thereto through the voltage relay 44 and contacts 51 which are controlled by a bridging member 52 secured to the push-rod 47 of the switch which is controlled by the throttle lever 46. The bridging member 52 is arranged on the push-rod 47, so that it is not brought into engagement with the contact 51 until the throttle lever 46 is moved slighly beyond full open position. In this way the operator can manipulate the throttle lever 46 so as to control the change in excitation of the generator 31, as required for various conditions of load.

In view of the foregoing it will be seen that I have provided a self-propelled vehicle wherein an engine is arranged to drive a generator having driving motors connected thereto for propelling the vehicle, in which the generator loads the engine to substantially the maximum power output thereof throughout the range of operation of voltage and current in the operation of the vehicle.

Modifications of the particular arrangements which I have disclosed embodying my invention will occur to those skilled in the art, so that I do not desire my invention to be limited to the particular construction set forth, and I intend in the appended claims to cover all modifications which do not depart from the spirit and scope of my invention.

What I claim as new and desire to secure by Letters Patent of the United States, is,—

1. An electrically driven vehicle having an engine, a generator driven by said engine, a driving motor for said vehicle connected to said generator, an excitation system for said generator, means for maintaining the major portion of the excitation of said system substantially constant throughout a portion of the range of operation of said generator, and means for varying the major portion of the excitation of said system substantially in accordance with an electrical characteristic of said generator throughout the remainder of the range of operation thereof.

2. An electrically driven vehicle having an engine, a generator driven by said engine, a driving motor for said vehicle connected to said generator, an excitation system for said generator, means for maintaining the major portion of the excitation of said system substantially constant throughout a portion of the range of operation of said generator, and means for varying the major portion of the excitation of said system substantially in accordance with the load current of said generator throughout the remainder of the range of operation thereof.

3. An electrically driven vehicle having an engine, a generator driven by said engine, a driving motor for said vehicle connected to said generator, an excitation system for said generator, means for maintaining the major portion of the excitation of said system substantially constant throughout a portion of the range of operation of said generator, and means controlled by said generator for varying the major portion of the excitation of said system in accordance with an electrical characteristic of said generator throughout the remainder of the range of operation thereof.

4. An electrically driven vehicle having an engine, a generator driven by said engine, a driving motor for said vehicle connected to said generator, an excitation system for said generator, means for maintaining the major portion of the excitation of said system substantially constant throughout a portion of the range of operation of said generator, and means controlled by said generator for varying the major portion of the excitation of said system in accordance with the load current of said generator throughout the remainder of the range of operation thereof.

5. An electrically driven vehicle having an engine, a generator driven by said engine, a driving motor for said vehicle connected to said generator, an excitation system for such generator, means for maintaining the major portion of the excitation of said system substantially constant throughout a portion of the range of voltage variation of said generator, and means for varying the major portion of the excitation of said system in accordance with an electrical characteristic of said generator throughout the remainder of the range of voltage variation thereof.

6. An electrically driven vehicle having an engine, a generator driven by said engine, a driving motor for said vehicle connected to said generator, an excitation system for said generator, means for maintaining the major portion of the excitation of said system substantially constant throughout a portion of the range of voltage variation of said generator, and means controlled by said generator for varying the major portion of the excitation of said system in accordance with an electrical characteristic of said generator throughout the remainder of the range of voltage variations thereof.

7. An electrically driven vehicle having an engine, a generator driven by said engine, a driving motor for said vehicle connected to said generator, an excitation system for said generator, means for maintaining the major portion of the excitation of said system substantially constant throughout a portion of the range of voltage variation of said generator, and means controlled by the load current of said generator for varying the major portion of the excitation of said system in accordance with an electrical characteristic of said generator throughout the remainder of the range of voltage variation thereof.

8. An electrically driven vehicle having an engine, a generator and an exciter driven by said engine, a driving motor for said vehicle connected to said generator, an excitation system for said generator connected to said exciter, an excitation system for said exciter, means including said exciter for maintaining the major portion of the excitation of said generator substantially constant throughout a portion of the range of operation thereof, and means including said exciter for varying the major portion of the excitation of said generator in accordance with an electrical characteristic thereof throughout the remainder of its range of operation.

9. An electrically driven vehicle having an engine, a generator and an exciter driven by said engine, a driving motor for said vehicle connected to said generator, an excitation system for said generator connected to said exciter, an excitation system for said exciter including a differential winding connected in series with said generator and said driving motor, means includng said exciter for maintaining the major portion of the excitation of said generator substantially constant throughout a portion of the range of operation thereof, and means including said exciter and said differential series field exciting winding for varying the major portion of the excitation of said generator in accordance with an electrical characteristic thereof throughout the remainder of its range of operation.

10. An electrically driven vehicle having an engine, a generator and an exciter driven by said engine, a driving motor for said vehicle connected to said generator, an excitation system for said generator connected to said exciter, an excitation system for said exciter, a battery, means for connecting the excitation system of said exciter to said battery throughout a portion of the range of operation of said generator, and means for connecting the excitation system of said exciter across the same throughout the remainder of the range of operation of said generator.

11. An electrically driven vehicle having an engine, a generator and an exciter driven by said engine, a driving motor for said vehicle connected to said generator, an excitation system for said generator connected to said exciter, an excitation system for said exciter, a battery, means for connecting the said excitation system to said exciter across said battery throughout a portion of the range of operation of said generator, and means controlled by an electrical characteristic of the said generator for disconnecting the excitation system of said exciter from said battery and for connecting the same across said exciter throughout the remainder of the range of operation of said generator.

12. An electrically driven vehicle having an engine, a generator and an exciter driven by said engine, a driving motor for said vehicle connected to said generator, an excitation system for said generator connected to said exciter, an excitation system for said exciter including a field exciting winding and a differential field exciting winding connected in series between said generator and said driving motor, a battery, means controlled by an electrical characteristic of said generator for connecting the excitation system of said exciter to said battery throughout a portion of the range of operation of said generator, and means controlled by an electrical characteristic of said generator for disconnecting the excitation system of said exciter from said battery and for connecting the same across said exciter throughout the remainder of the range of operation of said generator.

13. An electrically driven vehicle having an engine, a generator and an exciter driven by said engine, a driving motor for said vehicle connected to said generator, an excitation system for said generator connected to said exciter, an excitation system for said exciter, a battery, means for connecting the excitation system of said exciter across said battery throughout a portion of the range of voltage variation of said generator, and means controlled by the voltage of said generator for disconnecting the excitation system of said exciter from said battery and for connecting the same across said exciter throughout the remainder of the range of voltage variation of said generator.

14. An electrically driven vehicle having an engine, a generator and an exciter driven by said engine, a driving motor for said vehicle connected to said generator, an excitation system for said generator connected to said exciter, an excitation system for said exciter including a differential series field exciting winding connected in series between said exciter and said driving motor, a battery, means for connecting the excitation system of said exciter across said battery throughout a portion of the range of voltage variation of said generator, and means controlled by the voltage of said generator for disconnecting the excitation system of said exciter from said battery and for connecting the same across said exciter throughout the remainder of the range of voltage variation of said generator.

In witness whereof, I have hereunto set my hand this 10th day of October, 1928.

ERROL W. BRANDENSTEIN.